(12) United States Patent
Xinghua

(10) Patent No.: US 11,885,089 B2
(45) Date of Patent: Jan. 30, 2024

(54) MITIGATING FLOODING IN EXISTING COASTAL PLAIN AREAS

(71) Applicant: Shanghai Waterway Engineering Design And Consulting Co. Ltd, Shanghai (CN)

(72) Inventor: Ma Xinghua, Shanghai (CN)

(73) Assignee: Shanghai Waterway Engineering Design And Consulting Co. Ltd., Shanghai (CN)

( * ) Notice: Subject to any disclaimer, the term of this patent is extended or adjusted under 35 U.S.C. 154(b) by 0 days.

(21) Appl. No.: 18/156,811

(22) Filed: Jan. 19, 2023

(65) Prior Publication Data
US 2023/0235522 A1 Jul. 27, 2023

(30) Foreign Application Priority Data
Jan. 27, 2022 (CN) .......................... 202210100916.9

(51) Int. Cl.
*E02B 3/10* (2006.01)
*E03F 5/10* (2006.01)

(52) U.S. Cl.
CPC .................................. *E02B 3/102* (2013.01)

(58) Field of Classification Search
CPC ... E02B 3/02; E02B 3/10; E02B 3/102; Y02A 10/00; Y02A 10/11; Y02A 10/30; Y02A 10/40
See application file for complete search history.

(56) References Cited

U.S. PATENT DOCUMENTS

| 4,457,646 A | * | 7/1984 | Laesch | .................... E02B 3/041 |
| | | | | 405/36 |
| 10,465,409 B1 | * | 11/2019 | Barber | .................... F04D 13/16 |

(Continued)

FOREIGN PATENT DOCUMENTS

| CN | 102234993 A | 11/2011 |
| CN | 105887768 A | 8/2016 |

(Continued)

OTHER PUBLICATIONS

International Search Report and Written Opinion in counterpart International Application No. PCT/US2022/074952, dated Oct. 9, 2022, 4 pages.

(Continued)

*Primary Examiner* — Frederick L Lagman
*Assistant Examiner* — Stacy N Lawson
(74) *Attorney, Agent, or Firm* — Edell, Shapiro & Finnan, LLC

(57) ABSTRACT

A method for mitigating flooding in existing coastal plain areas includes: A dyke (or dykes) is (are) set/built on seabed outside partial existing coastline of an existing coastal plain area to form an enclosed area; the enclosed area, together with the dyke(s), the reservoir inlet(s) and outlet(s), constitutes a reservoir for containing rainwater; or, part(s) of the enclosed area is (are) of a reclamation area (or reclamation areas). Before the start of forecast heavy rainfall or continuous rainfall, the water level in the reservoir is lowered in advance and the water level of water area for containing rainwater in the existing coastal plain is also pre-lowered, so effective storage capacity for containing rainwater against flooding caused by rainfall in the locality is substantially increased. The present invention is applicable for the flooding control works, reclamation works, roads and highways and their integrated works in existing coastal plain areas.

24 Claims, 6 Drawing Sheets

(56) References Cited

U.S. PATENT DOCUMENTS

| | | | | |
|---|---|---|---|---|
| 2014/0056645 A1* | 2/2014 | Hogan | ................... | G01W 1/10 |
| | | | | 405/80 |
| 2017/0002532 A1* | 1/2017 | Jie | ........................... | E02B 1/003 |
| 2019/0249406 A1* | 8/2019 | McCamy | ............... | E03F 5/107 |

FOREIGN PATENT DOCUMENTS

| | | | |
|---|---|---|---|
| CN | 113216074 | A | 8/2021 |
| CN | 113550272 | A | 10/2021 |
| KR | 20140120985 | A | 10/2014 |
| TW | 201028509 | A1 | 8/2010 |
| TW | I521121 | B | 2/2016 |

OTHER PUBLICATIONS

Notice for Granting an Invention Patent with English Translation for counterpart Chinese Application No. 202210100916.9, dated Aug. 25, 2022, 4 pages.

\* cited by examiner

MITIGATING FLOODING IN EXISTING COASTAL PLAIN AREAS

CROSS-REFERENCE TO RELATED APPLICATION

This application claims priority from Chinese Patent Application No. 114351640, filed Jan. 27, 2022, the entire disclosure of which is incorporated herein by reference.

FIELD

The present invention relates to the planning and construction fields of urban and rural areas works, water conservancy works, coastal engineering and highway works, etc., and is of a method dedicated to increasing storage capacity for containing rainwater against flooding for existing coastal plain areas, containing rainwater from existing coastal plain areas and mitigating flooding caused by rainfall in the locality in existing coastal plain areas.

BACKGROUND

To avoid ambiguity, the following words or terms shall have the meanings described herein:

1. "Flooding caused by rainfall in the locality in plain areas" (hereinafter referred to as "flooding") as used herein refers to the phenomenon of water inundation (or accumulation) disaster on the ground (such as sites, roads, farmlands, green space, etc.) in the plain areas caused by heavy rainfall (precipitation) or continuous rainfall (precipitation) in the locality that exceeds the drainage and storage capacity of the area.

It is noted that the Chinese version of the present invention adopts the word "内涝 (Chinese Pinyin is spelled "neilao", the same below, and the English word for it is usually "waterlogging"), but due to certain differences in the definition and the usage of the word "waterlogging" and "floods/flooding" in Chinese and English, in order to accurately express the meaning, avoid misunderstanding, and facilitate understanding and communication, the word "内涝 (neilao)" in the Chinese version of the present invention is translated to the expression "flooding caused by rainfall in the locality in plain areas" in the English version, instead of being translated to "waterlogging". More explanations are detailed as follows:

1) In Chinese

According to the Baidu Baike (baike.baidu.com):

"Floods/flooding" means a water flow phenomenon in which the water volume of rivers, lakes and seas increases rapidly or the water level rises rapidly, caused by such natural factors as rainstorm, sudden melting of ice and snow, storm surge, etc.

"内涝 (neilao)" originally refers to the phenomenon of reduced production and death of crops caused by frequent rain, too much water and too high humidity in the soil, and the lack of timely discharge of water, now it is also used to refer to the phenomenon of water inundation disaster occurred in urban areas due to heavy or continuous precipitation exceeding the capacity of urban drainage, or disaster caused by excessive rainfall, low-lying terrain, and stagnant water being not discharged in time. In other words, "内涝 (neilao)" is a kind of "floods/flooding" in Chinese. In China, to refer to the phenomenon of the water inundation on ground surface caused by rainfall in the locality, the word "内涝 (neilao)" is usually used, instead of the word "floods/flooding". Therefore, the Chinese version of the present invention adopts the word "内涝 (neilao)".

2) In English

According to World Health Organization official website (www.who.int), "floods/flooding" are the most frequent type of natural disaster and occur when an overflow of water submerges land that is usually dry; Floods are often caused by heavy rainfall, rapid snowmelt or a storm surge from a tropical cyclone or tsunami in coastal areas.

According to an official website of the U.S. Department of Homeland Security (WWW.FEMA.gov), "floods/flooding" occur naturally and can happen almost anywhere. They may not even be near a body of water, although river and coastal flooding are two of the most common types. Heavy rains, poor drainage, and even nearby construction projects can put you at risk for flood damage.

3) To sum up, the meaning of "floods/flooding" in English is consistent with the meaning of "floods/flooding" in Chinese; "waterlogging" in English is used for agriculture, and its meaning is consistent with the original meaning of "内涝 (neilao)" in Chinese, but it does not imply the meaning that "the phenomenon of water inundation disaster occurred in urban areas due to heavy or continuous precipitation exceeding the capacity of urban drainage".

Therefore, if it is to express "the phenomenon of water inundation disaster occurred due to heavy precipitation or continuous precipitation in the locality exceeding the drainage capacity of the area" in English, it needs to use the word "flooding" instead of "waterlogging". In order to accurately express the meaning, avoid misunderstanding, and facilitate understanding and communication, the word "内涝 (neilao)" in the Chinese version of the invention is translated to the expression "flooding caused by rainfall in the locality in plain areas" in the English version, instead of being translated to "waterlogging". For example, the Chinese words "大学校长 (means head of university" and "中学校长 (means head of high school)" need to be translated into "President of the university" and "Principal of the high school" in English respectively, but cannot be literally translated into "Head of the university" and "Head of the high school".

2. "Water area For containing Rainwater against flooding caused by rainfall in the locality" (for the convenience of narration, hereinafter referred to as WFR) as used herein refers to river networks, lakes, ground surface reservoirs, etc. in plain areas that are provided with functions of containing rainwater from heavy rainfall (precipitation) or continuous rainfall (precipitation) and mitigating water inundation (or accumulation) (namely, mitigating the flooding) on the ground, excluding mountain reservoirs, flood detention areas or flood discharge areas that mainly contain upstream floods.

In plain areas, the rainwater drainage is generally in following path: rainfall→①  ground surface flow/runoff→② flow of rainwater pipe networks and runoff of ditches/canals→③ rainwater catchment into WFR (river networks, lakes and ground surface reservoirs) and runoff of river networks→④ drainage into downstream flood discharge rivers (for inland plain areas), and drainage into the local sea (for coastal plain areas) through river network outlet(s). During the period of heavy rainfall or continuous rainfall, ground water inundation (or accumulation) disaster (i.e. flooding) will not occur when the rainwater storage and drainage capacity of ③ is greater than the drainage capacity of ② and the drainage capacity of ② is greater than the ground surface flow of ①. However, the ground water inundation disaster (i.e. flooding) will occur either when the drainage capacity of ② is less than the ground surface flow of ① or the rainwater storage and drainage capacity of ③ is less than the drainage capacity of ②. (The present invention is especially applicable to the situation that the drainage capacity of rainwater pipe networks and ditches/canals is greater than ground surface flow, but the WFR's effective storage capacity for containing rainwater (namely, =maximum storage capacity of the WFR—occupied storage capacity of the WFR before the start of rainfall) and drainage capacity of river networks is less than ground surface flow in plain areas, resulting in flooding).

I. Present Methods to Solve Flooding Problem Caused by Rainfall in the Locality in Inland Plain Areas Currently, the flooding problem in inland plain areas is normally solved by methods as follows: Firstly, storing rainwater in the WFR, which generally are river networks and lakes in plain areas, such as river networks of the Yangtze River Delta in China, Taihu Lake, Dianshan Lake, etc., where the normal water level is lower than the ground surface elevation in the area, and the storage capacity between the normal water level and the ground surface elevation is the natural rainwater storage capacity, which can serve to contain rainwater and mitigate flooding on the ground surface in the area. Secondly, the excessive rainwater in river networks and lakes that exceeds normal water level is discharged into the downstream river network(s) by making use of water level differences. Thirdly, setting enclosed area(s) and hydraulically pumping rainwater to flood discharge river(s) outside the enclosed area, so as to mitigate flooding in the enclosed area. For example, the rainwater from rainfall in Puxi area located within the inner ring of Shanghai, China is hydraulically pumped into the Huangpu River.

II. Present Methods to Solve Flooding Problem Caused by Rainfall in the Locality in Existing Coastal Plain Areas Present methods to solve flooding problem caused by rainfall in the locality in existing coastal plain areas (hereinafter referred to as "Present flooding control methods") include:

Present flooding control method 1: Containing rainwater by making use of the storage capacity between the normal water level and the ground surface elevation in the WFR (river network and lake) (hereinafter referred to as natural rainwater storage capacity $V_1$ of the WFR).

Present flooding control method 2: Within a few days (e.g. a week) before the start of forecast heavy rainfall or forecast continuous rainfall, the drainage sluice(s) is (are) opened during the period of low tide to discharge water in the WFR (river network(s) and lake(s)) in advance into the local sea, so as to lower the water level and increase rainwater storage capacity of the WFR (hereinafter referred to as rainwater storage capacity increased by conventional pre-lowering $V_2$ of the WFR). Then effective storage capacity for containing rainwater against flooding of the WFR=natural rainwater storage capacity $V_1$ of the WFR+rainwater storage capacity increased by conventional pre-lowering $V_2$ of the WFR.

Present flooding control method 3: On the basis of method 2, during the period of heavy rainfall or continuous rainfall, the drainage sluice(s) is (are) opened when the local sea is at lower tide level to discharge water in the WFR (river networks and lakes) into the local sea, so as to lower the water level therein. However, due to the low topography of the coastal plain (small elevation difference between the ground surface and the local sea tide level) and continuous fluctuation of tidal levels in the local sea, though there is certain elevation difference between the ground surface and the local sea tide level in the low tide level period, the duration is short, moreover the elevation difference between the ground surface and the local sea tide level in other periods are slight, which makes the amount of water discharged into the local sea through the drainage sluice(s) small during heavy rainfall or continuous rainfall. If encountering concurrently astronomical tide and storm surge elevation, the drainage sluice(s) can hardly discharge water. Once the water volume from heavy rainfall or continuous rainfall exceeds the effective storage capacity (for containing rainwater against flooding) $V_1+V_2$ in the WFR, flooding will occur in most cases in the coastal plain area.

Present flooding control method 4: On the basis of method 3, the installation of drainage pumping station(s) is added, and the pumping drainage method or the combined mode of pumping drainage and sluice drainage is used to lower the water level in the WFR to mitigate the flooding phenomenon during the period of heavy rainfall or continuous rainfall. For example, the said method has been gradually implemented in Shanghai, China since the end of last century. The disadvantages of this method lie in that the running time of drainage pumping station(s) during the period of heavy rainfall or continuous rainfall is very short (basically equal to the duration of heavy rainfall or continuous rainfall) and that the required drainage capacity is quite large due to high drainage intensity, while the unit drainage capacity ($m^3/s$) of drainage pumping station(s) requires high capital investment and operation cost. If existing coastal plain areas need to meet a very high design return period standard for flooding prevention (such as a return period standard of 50 to 100 years for 24-hour rainfall), the drainage pumping station(s) needs to be built with a large scale, the infrastructure investment and operation cost are expensive, and generally financial resources are difficult to bear, so low design return period standard of flooding prevention and control can only be adopted. For example, the return period standard for 24-hour rainfall of Shanghai, China in 2015 was 5 to 10 years. Once it exceeded the rainfall standard, flooding would occur, so the frequency of flooding was very high.

Present flooding control method 5: On the basis of present flooding control method 1 or method 2, 3 and 4, building underground reservoir(s)/detention tanks or deep tunnel system(s) is used to increase effective rainwater storage capacity and mitigate flooding caused by rainfall in the locality, such as the underground reservoirs/detention tanks constructed in Singapore. This method has the disadvantages of small construction space, low water storage capacity and high construction cost for underground water reservoir/detention tanks and deep tunnel system.

For the convenience of comparison with the following invention, an example is given to illustrate the present flooding control methods for existing coastal plain areas. The existing coastal plain area A is provided with following conditions: 1) the total area is $S_1$ and the ground surface elevation is 4.0 m; 2) the WFR area is $S_2$, and for simplicity, it is assumed that the WFR's shore is upright in vertical; the water area ratio is 10% (which equals to the ratio of $S_2$ to $S_1$), and the normal water level is 2.6 m in the WFR; 3) mean high tide level of the local sea is 3.0 m, mean tide level is 2.0 m, mean low tide level is 1 m, and within one tide (for a duration of 12.5 hours), the duration during which tide level is lower than the mean tide level is about 6 hours; 4) when encountering astronomical tide and storm surge elevation, there is an increase of 2 m for water level of the local sea, the high tide level is up to 5.0 m, the mean tide level is up to 4.0 m, the low tide level is up to 3 m, and within one tide (for a duration of 12.5 hours), the duration during which tide level is lower than 3.5 m is about 3 hours; 5) the planned or design highest tide level of the local sea is 5.0 m; 6) 24-hour rainfall for a return period standard of 10 years, 100 years and 500 years is 0.215 m (215 mm), 0.315 m (315 mm) and 0.385 m (385 mm) respectively.

Present flooding control method 1: natural rainwater storage capacity $V_1$ of the WFR=(ground surface elevation of the existing coastal plain area−normal water level of the WFR)×$S_2$=(4−2.6)×$S_2$=1.4×10% $S_1$=0.14$S_1$, which is equivalent to the rainfall of 0.14 m in the existing coastal plain area A, in the case without considering ground water seepage (namely, a runoff coefficient of 1.0, the same below).

Present flooding control method 2: On the basis of method 1, within a week before the start of forecast heavy rainfall or forecast continuous rainfall, the drainage sluice(s) is (are) opened during the period of low tide (the period when the tide level is 1.0 m to 2.0 m) to discharge water in the WFR in advance into the local sea, and the water level therein is lowered to 2.0 m from 2.6 m, thereby forming the rainwater storage capacity increased by conventional pre-lowering $V_2$ of the WFR. So, the effective storage capacity for containing rainwater against flooding of the WFR=natural rainwater storage capacity $V_1$+rainwater storage capacity increased by conventional pre-lowering $V_2$=0.14$S_1$+(normal water level of the WFR−pre-lowered water level in the WFR)×$S_2$=0.14$S_1$+(2.6−2.0)×$S_2$=0.14$S_1$+0.6×10% $S_1$=0.2$S_1$, which is equal to the rainfall of 0.2 m in the existing coastal plain area A, in the case without considering ground water seepage (namely, 0.2 m×$S_1$=0.2$S_1$), and equivalent to the 24-hour rainfall of 0.215 m (215 mm) for a return period of 10 years.

Present flooding control method 3: On the basis of method 2, during the period of heavy rainfall or continuous rainfall, the drainage sluice(s) is (are) opened when the local sea is at lower tide level (the period when the tide level is lower than 3.5 m) to discharge water in the WFR into the local sea to lower the water level in the WFR. When encountering astronomical tide and storm surge elevation, the water level of the local sea will increase by 2 m, the high tide level is up to 5.0 m, the mean tide level of the local sea is up to 4.0 m, the low tide level is up to 3 m, and the duration of low tide level (the duration when the tide level is lower than 3.5 m) is short (3 hours for each tide period); moreover, due to the slight elevation difference (ranging from 0.5 m to 1 m) between the ground surface and the local sea tide level, the amount of water that can be discharged into the local sea through the drainage sluice(s) is very small. Once the short-term rainfall or continuous rainfall in the said area exceeds 0.2 m, the amount of water flowing to the WFR will be more than 0.2$S_1$ in the case without considering ground water seepage, while the effective storage capacity (for containing rainwater against flooding) of the WFR are exactly $V_1$+$V_2$=0.2$S_1$; therefore, the flooding occurs in most cases in the existing coastal plain area A.

For a long time, the aforesaid flooding control methods are widely applied around the world to constantly mitigate the flooding problem caused by rainfall in the locality in existing coastal plain areas; but up to now, the flooding problem caused by rainfall in the locality is still very prominent in existing coastal plain areas.

1. Coastal plain areas in Shanghai, China are prone to flooding due to heavy rain and storm surge elevation during typhoon period, such as the severe flooding occurred in August 2015.

2. Severe flooding occurred in the coastal plain areas of Macau, China in July 2012 and September 2018.

3. Jakarta, located in the coastal plain area in Indonesia, is prone to flooding in the rainy season (which lasts from January to March) every year, for example, severe flooding occurred in 2017, 2018, 2020 and 2021, among which the deepest water inundation (or accumulation) depth on urban streets occurred in February 2018 was up to 2 m, even the shallowest was up to 0.5 m.

4. Located in the coastal plain area, Singapore is known for its world-renowned rainwater collection and flooding control facilities, including large ground surface reservoirs, underground detention tanks, green roofs, rain gardens, porous pavements, etc. As for the large scale ground surface reservoir, since the construction of the first one in 1868, a total of 17 reservoirs have been built by the year 2011 to capture rainwater as a source of water supply and minimize flooding risks at the same time, with the operating principle of collecting rainwater resources to the maximum extent. In the case that the amount of rainwater exceeds the effective storage capacity of reservoirs, the excessive rainwater exceeding the storage capacity will be discharged into the local sea through the drainage sluice(s) and drainage pumping station(s). Nevertheless, a moderate to heavy rain on Apr. 17, 2021 with a total rainfall of 170.6 mm, causing the water level in many canals and rivers to exceed the warning level, water inundation (or accumulation) on many roads, flooded basements, damaged vehicles, and blocked traffic in partial road sections, also known as the "April 17 Rainfall Event of 2021" in Singapore.

5. Located in the coastal plain area in USA, New York is also renowned for its world famous and perfect flooding prevention facilities, however severe flooding still occurred in September 2021.

It can be seen from above that flooding problem caused by rainfall in the locality in existing coastal plain areas has been plaguing the industry all along but has not been resolved.

III. Present Reclamation Technologies Related to Flooding Prevention

Normally, present land reclamation technologies are to directly reclaim on the seabed outside the coastline to form land (namely, coastal beach reclamation), or build offshore artificial islands by making use of coastal beaches. An artificial lake is set in the middle area in a small number of costal beach reclamation works to serve as its own WFR. For example, a coastal beach reclamation work was carried out at the East Beach in Nanhui district Shanghai, China in 2002 for the construction of the main urban area of Lingang New City, in the middle of which a lake named as Dishui Lake was set to serve as the landscape lake and self-own WFR for the main urban area of Lingang New City. The Dishui Lake follows present flooding control method 1 to method 3 (as mentioned above) but does not serve as WFR for the existing coastal plain area.

To sum up, there has been a lack of methods in present technologies that can substantially mitigate the flooding problem caused by rainfall in the locality in existing coastal plain areas, and how to substantially mitigate the flooding caused by rainfall in the locality in existing coastal plain areas has been a problematic and unsolved problem that has been plaguing the industry all along.

SUMMARY

To avoid ambiguity, following words or terms shall have the meanings described herein:

1. The term "Existing coastal plain area(s)" as used herein refers to the plain area(s) within and adjacent to the existing coastline.

2. The term "Reservoir on coastal beach for containing Rainwater against flooding caused by rainfall in the locality" (for the convenience of narration, hereinafter referred to as RFR) as used herein is a part of technical solutions of the said invention (not belong to present technologies), which is to set/build three dykes with a U-shape layout or a dyke with C-shaped layout or a dyke with a layout of arbitrary linear shapes that connect(s) the existing coastline on the seabed outside the existing coastline (more generally, "on the coastal beach") to form an enclosed area, or four dykes with a □-shaped layout, or a dyke with a D-shaped layout or a dyke with a layout of arbitrary shapes to form an enclosed area on the coastal beach. The enclosed area serves as a reservoir for containing rainwater from the existing coastal plain area and mitigating flooding therein. For the convenience of narration, the said RFR is also referred to as "RESERVOIR" under the condition of no ambiguity.

In accordance with example embodiments of the invention, a method dedicated to mitigating flooding in existing coastal plain areas is provided, which includes: A dyke (or dykes) is (are) set/built on seabed outside partial existing coastline of an existing coastal plain area to form an enclosed area; The enclosed area, together with the dyke(s), the reservoir inlet(s) and outlet(s), constitutes a RESERVOIR for containing rainwater; Or, part(s) of the enclosed area is (are) of a reclamation area (or reclamation areas); Before the start of forecast heavy rainfall or continuous rainfall, the water level of the RESERVOIR is lowered in advance, and the water level of WFR in the existing coastal plain is also lowered in advance, so effective storage capacity for containing rainwater against flooding caused by rainfall in the locality is substantially increased. The present invention is applicable for the flooding control works, reclamation works, roads and highways and their integrated works in existing coastal plain areas.

The present invention is especially applicable to the situation that the drainage capacity of rainwater pipe networks and ditches/canals is greater than ground surface flow, but the WFR's effective storage capacity for containing rainwater (from upcoming heavy rainfall or continuous rainfall) against flooding (namely, =maximum storage capacity of the WFR— occupied storage capacity of the WFR before the start of rainfall) and drainage capacity of river networks is less than ground surface flow in exiting coastal plain areas, resulting in flooding (caused by rainfall in the locality).

In accordance with example embodiments of the present invention, the present invention is to provide a method for setting up a RFR to substantially increase effective storage capacity for containing rainwater against flooding for existing coastal plain areas, for containing the rainwater drainage caused by heavy rainfall or continuous rainfall while rainfall exceeds storage capacity of WFR within existing coastal plain areas, and thus substantially mitigating the flooding problem caused by rainfall in the locality in existing coastal plain areas, so as to address the inadequacy of present flooding control technologies.

Example embodiments of the present invention include:

An example embodiment of the first method of the present invention to mitigate flooding in existing coastal plain areas:

1. On the seabed outside partial existing coastline of an existing coastal plain area, three dykes with an U-shaped layout or a dyke with a C-shaped layout or a dyke with an arbitrary linear-shaped layout that connect(s) the existing coastline, are (is) set/built to form an enclosed area, or four dykes with a □-shaped layout, or a dyke with a D-shaped layout or a dyke with a layout of arbitrary shapes are (is) set/built to form an enclosed area; A reservoir inlet (or reservoir inlets) connecting river network(s) and rainwater pipe network(s) of the existing coastal plain area to the enclosed area, and a reservoir outlet (or reservoir outlets) connecting the enclosed area to the local sea, are both set on the said dyke(s); The enclosed area, together with the dyke(s), the reservoir inlet(s) and the reservoir outlet(s), constitutes the RFR; The crest elevation of the dyke(s) is higher than the planned or design highest water level in the RFR and the planned or design highest tide level of the local sea;

2. Within a few days (such as a week) before the start of forecast heavy rainfall or forecast continuous rainfall, partial water in the RFR is discharged to the local sea in advance through the reservoir outlet(s) (please refer to item 5 of the first method of the invention for details), and the water level in the RFR is lowered in advance to the planned or design water level which water level in the RFR needs to be pre-lowered to reach (hereinafter referred to as the planned or design pre-lowered water level in the RFR) before the start of forecast heavy rainfall or forecast continuous rainfall; The said water level (namely the planned or design pre-lowered water level in the RFR) is lower than the historical mean sea level of the local sea, preferably lower than historical mean low tide level of the local sea, thus forming a huge drop between the ground surface of the existing coastal plain area and the water level in the RFR, as well as forming the effective storage capacity $V_3$ for containing rainwater of the existing coastal plain area, in the case that the RFR's shore is upright in vertical, $V_3$=(the planned or design highest water level in the RFR–the planned or design pre-lowered water level in the RFR)×$S_3$, $S_3$ is area of the RESERVOIR; The planned or design highest water level in the RFR should be less than or equal to the ground surface elevation of the existing coastal plain area; The drainage capacity of drainage sluice(s) and drainage pumping station(s) should be competent to satisfy the requirements that both water volume which needs to be pre-lowered in the RESERVOIR and water volume which needs to be pre-lowered in the WFR can be discharged from the RESERVOIR within the duration of pre-lowering; The drainage capacity of drainage sluice(s) and drainage pumping station(s) can be determined pursuant to present calculation methods such as those provided in Design Specification for Sluices and Code for Design of outdoor Wastewater Engineering (Chinese code);

In this process, the sluice(s) at the reservoir inlet(s) is (are) opened and controlled to make partial water in the WFR (river networks and lakes, etc.) and rainwater pipe network(s) of the existing coastal plain area flow into the RFR in advance through the reservoir inlet(s) (the present flooding control method 2 as mentioned under background technology can be adopted at the same time, that is, during the period of low tide, opening a drainage sluice or drainage sluices set on the existing coastline outside the RFR to discharge water in the WFR into the local sea in advance), so that the water level of the WFR in the existing coastal plain area is also lowered in advance, with an amplitude of this expanded pre-lowering greater than that brought by method 2 as mentioned under background technology (namely, resulting in an expanded pre-lowering of water level in the WFR by means of the RFR); The effective storage capacity for containing rainwater against flooding in the existing coastal plain area=natural rainwater storage capacity $V_1$ of the WFR+rainwater storage capacity increased by expanded pre-lowering $V_2'$ of the WFR; The discharge capacity of the sluice(s) at reservoir inlet(s) should be competent to satisfy requirements that water volume which needs to be pre-lowered in the WFR can be discharged to the RESERVOIR within the duration of pre-lowering; The discharge capacity of the sluice(s) can be determined pursuant to present calculation methods such as those provided in Design Specification for Sluices (Chinese code).

Thus, by applying the said invention, the total effective storage capacity for containing rainwater against flooding for the existing coastal plain area=natural rainwater storage capacity $V_1$ of the WFR+rainwater storage capacity increased by expanded pre-lowering $V_2'$ of the WFR+rainwater storage capacity $V_3$ of the RFR, which is far larger than the effective storage capacity using the present flooding control methods as mentioned under background technology, namely, the effective storage capacity for containing rainwater against flooding of the existing coastal plain area=natural rainwater storage capacity $V_1$ of the WFR+rainwater storage capacity increased by conventional pre-lowering $V_2$ of the WFR.

During the period of heavy rainfall or continuous rainfall, rainfall in the existing coastal plain area converges into the WFR from ground surface and then flows into the RFR through the reservoir inlet(s); Since the total effective storage capacity for containing rainwater against flooding for the existing coastal plain area is now much larger than that of the existing coastal plain area using the present flooding control methods as mentioned under background technology, the flooding caused by rainfall in the locality in the existing coastal plain area is substantially mitigated.

Meanwhile, since the elevation difference between the ground surface of the existing coastal plain area and the water level of the WFR is significantly larger than that between the ground surface of the existing coastal plain area and the tide level of the local sea, so that the gradient i' of river runoff and rainwater pipe network flow from the existing coastal plain area to the RFR is also significantly larger than the gradient i of the existing coastal plain area that directly discharges into the local sea; Thus, the corresponding drainage speed and drainage capacity (water discharge per unit time) are significantly increased comparatively, the discharge speed of ground surface water from rainfall in the existing coastal plain area is accelerated significantly, and the water inundation (or accumulation) on the ground is substantially mitigated, in other words, the flooding caused by rainfall in the locality is substantially mitigated.

3. In the case that the elevation of existing seabed within the RFR is higher than the planned or design pre-lowered water level in the RFR, the existing seabed is excavated to the planned or design pre-lowered water level in the RFR; The dyke structure should be competent to withstand actions of water level and waves in the RESERVOIR, tidal level and waves of the local sea, and actions caused by differences between water levels inside and outside the RESERVOIR, as well as actions of seepage due to the differences between water levels inside and outside the RESERVOIR.

4. The reservoir inlet(s) can make use of existing sluice(s) of the river network(s) and rainwater pipe network(s) in the existing coastal plain area, or the reservoir inlet(s) is (are) equipped with new inlet sluice(s); The reservoir inlet sluice (s) is (are) used to prevent the water level of the WFR in the existing coastal plain area from being pre-lowered too low or prevent the reservoir water from flowing back into the WFR in the existing coastal plain area; If no secondary disasters affecting the safety of revetment or riverfront buildings will be caused by the water level of the WFR being pre-lowered too low, or if there will be no backflow of reservoir water to the WFR, the reservoir inlet(s) can also be without sluice(s), and river network(s) & rainwater pipe network(s) of the existing coastal plain area can be directly connected the RFR.

5. The reservoir outlet(s) is (are) equipped both with a drainage sluice (or drainage sluices) and a drainage pumping station (or drainage pumping stations); Sluice drainage mode is used, that is, to open the sluice(s) during the period of low tide to discharge water (in the RFR) above the low tide level into the local sea, or pumping drainage mode is used, that is, to discharge water in the RFR hydraulically into the local sea through the drainage pumping station(s) to further lower the water level therein, or combined mode of sluice drainage and pumping drainage is used to lower the water level in the RFR more quickly; The reservoir outlet(s) can also be only set with drainage sluice(s), which is (are) opened only during the period of low tide to discharge the water (in the RFR) above the low tide level into the local sea.

6. Furthermore, an expressway or highway can be set/built on the top of the dyke(s) to connect the road network(s) or highway network(s) in the existing coastal plain area, which can deliver the beneficial effect of improving local traffic networks.

7. Furthermore, floating solar photovoltaic systems (photovoltaic power generation facilities) can be set up on part(s) of water surface in the RFR to generate electricity by utilizing solar energy during non-rainfall period, so as to provide power for the RFR that uses pumping drainage to lower water level.

8. Furthermore, appropriate landscape, leisure and amusement facilities can be set up in the RFR, including landscape belt around the lake, green belt around the lake, wetlands within the lake, water sports center, water playground, port area for yachts and the ship locks for access of yachts to the RESERVOIR, which can be open to the public during non-rainwater catchment period and closed during rainwater catchment period. The beneficial effect this practice delivers is that the RFR can be developed comprehensively.

The aforesaid dyke(s), excavation of seabed, reservoir inlet sluice(s), drainage sluice(s), drainage pumping station(s), floating solar photovoltaic systems, expressway or highway on the top of the dyke, and landscape, leisure, amusement facilities can be carried out using present technologies, which do not need to be introduced in details hereby.

An example embodiment of the second method of the present invention to mitigate flooding in existing coastal plain areas:

1. On the seabed outside partial existing coastline of an existing coastal plain area, three dykes with an U-shaped layout or a dyke with a C-shaped layout or a dyke with an arbitrary linear-shaped layout that connect(s) the existing coastline, are (is) set/built to form an enclosed area, or four dykes with a □-shaped layout, or a dyke with a D-shaped layout or a dyke with a layout of arbitrary shapes, are (is) set/built to form an enclosed area; A reservoir inlet (or reservoir inlets) connecting river network(s) and rainwater pipe network(s) of the existing coastal plain area to the enclosed area, and a reservoir outlet (or reservoir outlets) connecting the enclosed area to the local sea, are both set on the said dyke(s); A portion of the enclosed area, together with its bordering dyke(s), the reservoir inlet(s) and the reservoir outlet(s), constitutes the RFR; The remaining area(s) within the enclosed area are of the reclamation area(s) to be backfilled or reclaimed to form lands. The crest elevation of the dyke(s) is higher than the planned or design highest water level in the RFR and the planned or design highest tide level of the local sea;
2. Same as the item 2 of the first method of the present invention to mitigate flooding in existing coastal plain areas.
3. The main part of the RFR is set preferably on the side adjacent to or close to the existing coastline, so as to shorten the distance between the river network(s) & rainwater pipe network(s) of the existing coastal plain area and the RFR to the maximum extent; In the case that the elevation of existing seabed within the RFR is higher than the planned or design pre-lowered water level in the RFR, the existing seabed is excavated to the planned or design pre-lowered water level in the RFR; The structure of dyke(s) of the RFR should be competent to withstand actions of water level and waves in the RESERVOIR, the tidal level and waves of the local sea, and actions caused by differences between water levels inside and outside the RESERVOIR, as well as actions of seepage due to the differences between water levels inside and outside the RESERVOIR.
4. Same as the item 4 of the first method of the present invention to mitigate flooding in existing coastal plain areas.
5. Same as the item 5 of the first method of the present invention to mitigate flooding in existing coastal plain areas.
6. Same as the item 6 of the first method of the present invention to mitigate flooding in existing coastal plain areas.
7. Same as the item 7 of the first method of the present invention to mitigate flooding in existing coastal plain areas.
8. Same as the item 8 of the first method of the present invention to mitigate flooding in existing coastal plain areas.
9. Main part of the reclamation area(s) is(are) set preferably on the side adjacent to or close to the local sea, and the ground surface elevation of the reclamation area(s) is not lower than the planned or design highest water level in the RFR; If crest elevation of the seaside revetment(s) for the reclamation area(s) is higher than the planned or design highest tide level of the local sea and the structure is competent to withstand actions of tidal level and waves of the local sea, the portion of the said dyke(s) located in the reclamation area(s) can directly make use of the seaside revetment(s) of the reclamation area(s); Present technologies are adopted for seaside revetment(s).
10. The RFR is mainly to contain rainwater from the existing coastal plain area and mitigate flooding in the existing coastal plain area; For this purpose, the ground surface elevation of the reclamation area(s) had better be not lower than historical highest tide level of the local sea and the planned or design highest tide level of the local sea, so that the rainfall in the reclamation area(s) can be directly discharged into the local sea through its (their) own river network(s) and rainwater pipe network(s) without occupying storage capacity of the RFR.

By adopting the aforesaid technical solutions including the RFR, the present invention can substantially increase the effective storage capacity for containing rainwater against flooding for the existing coastal plain area, for containing the rainwater drainage caused by heavy rainfall or continuous rainfall while rainfall exceeds storage capacity of the WFR within the existing coastal plain area, as a result, the flooding problem caused by rainfall in the locality is substantially mitigated.

The embodiments of the present invention are different from the technology of large-scale ground surface reservoirs adopted by Singapore, regarding functions, operation principle and flooding prevention effects as well as drainage pump station scale. A specific analysis is made as follows:

According to the official website of PUB, Singapore, the ground surface reservoirs are used to capture rainwater as a source of water supply and minimize flooding risks at the same time. The reservoirs can be separated into inland reservoirs and coastal reservoirs. Regarding minimizing flooding risks, the inland reservoirs are used to mitigate inland areas' flooding caused by rainfall in the locality, while the coastal reservoirs are used to prevent coastal areas from flooding caused by high tide level or storm surge elevation of local sea. The operation principle of the reservoirs is, collecting rainwater resources to the maximum extent (according to the official website of PUB, one of the holistic approaches to water management is to collect every drop of water), and in the case that the amount of rainwater from heavy rainfall exceeds the effective storage capacity of the reservoirs (namely, =maximum storage capacity of the reservoirs−occupied storage capacity of the reservoirs before the start of heavy rainfall), the excessive rainwater will be discharged into the local sea through the drainage sluice(s) and drainage pumping station(s). So, the function of collection of rainwater as fresh water resources is dominated, with prevention of flooding caused by rainfall in the locality as a supplement, thus making the reservoirs usually remain comparative higher water levels especially in rainy season, resulting in the small elevation differences between the ground surface and the higher water level in the reservoirs, small effective storage capacity for heavy rainfall and limited capacity to withstand short term heavy rainfall especially in rainy season. Consequently, there are conflicts between collection of rainwater as fresh water resources and prevention of flooding caused by rainfall in the locality in heavy rainfall days. For example, sometimes when encountering comparative heavier rainfall, after it is found that volume of actual rainwater from heavy rainfall exceeds effective storage capacity of the corresponding reservoirs, then discharging rainwater into the local sea through drainage sluice(s) and drainage pumping station(s), there is not enough time for the drainage sluice(s) and drainage pumping station(s) to complete the drainage due to short available drainage time, causing water inundation (or accumulation) on the ground. Therefore, the "April 17 Rainfall Event of 2021" still occurred, under a total rainfall of only 170.6 mm (please refer to the section as mentioned under background technology). As for drainage pump station scale, due to pump drainage intensity is very large during fulfillment of flooding prevention, the drainage pump station scale and investment required is very large. For example, the marina barrage of marina reservoir is equipped a drainage pump station with seven of the world's largest drainage pumps (in 2008), each of the pumps weights 28 tons and is able to drain about 150,000 $m^3$ of water per hour, and the total pump drainage capacity is 1,050,000 $m^3/h$.

The primary and core functions of the RFR as referred to in the embodiments of the present invention are for containing rainwater (from upcoming heavy rainfall or continuous rainfall) against flooding caused by rainfall in the locality in exiting coastal plain areas. Such as the embodiment 1 and 2, as long as the area of the RFR is up to 1/40 to 1/20 of the area of the existing coastal plain area and lowering the water level in the RFR to a comparative lower level in advance before the arrival of heavy rainfall or continuous rainfall, the effective storage capacity for heavy rainfall or continuous rainfall against flooding (namely, maximum storage capacity of the WFR and the RFR-occupied storage capacity of the WFR and the RFR before heavy rainfall or continuous rainfall) and bearable volume of short-term heavy rainfall or continuous rainfall in the existing coastal plain area can be multiplied, and the flooding control capacity can be substantially increased to a return period standard of 100 years to 500 years (for 24-hour rainfall) from a return period standard of 1 year to 10 years (for 24-hour rainfall). With regard to drainage pump station scale, as water level in the RFR is pre-lowered and partial water in the RFR is discharged to local sea in advance within a few days before the start of forecast heavy rainfall or continuous rainfall, the drainage duration (such as a week) is several times that of the reservoirs of Singapore (usually less than one day), so drainage intensity, drainage pump station scale and investment required is a fraction of that of the reservoirs of Singapore under same condition.

The example embodiments of the present invention are applicable for the flooding control works, reclamation works, road or highway works as well as the integration works of flooding control, reclamation, and roads or highways in existing coastal plain areas.

The above and still further features and advantages of the present invention will become apparent upon consideration of the following detailed description of specific embodiments thereof.

BRIEF DESCRIPTION OF THE DRAWINGS

Like reference numerals have been used to identify like elements throughout this disclosure.

DETAILED DESCRIPTION

In the figures, the reference numbers are described as follows: 1, the existing coastline; 2, the existing coastal plain area; 3, the seabed outside (partial) existing coastline; 4, the river network(s) in the existing coastal plain area; 5, the rainwater pipe network(s) in the existing coastal plain area; 6, the dyke(s); 7, RFR (or RESERVOIR); 8, reservoir inlet(s); 9, reservoir outlet(s); 10, road(s) or highway(s) in the existing coastal plain area; 11, floating solar photovoltaic systems; 12, reclamation area; 13, the local sea.

The present invention will be further explained with reference to attached figures and embodiments.

Embodiment 1

For the purpose of effect comparison, the existing coastal plain area A described in the background technology is taken as an example, with the following conditions: 1)~6) refer to the 1)~6) conditions of the existing coastal plain area A as described in the background technology; 7) The original flooding control method is the present flooding control method 2, that is, lowering the water level of the WFR to 2.0 m in advance within a week before the start of forecast heavy rainfall or continuous rainfall, then effective storage capacity for containing rainwater against flooding of the WFR=natural rainwater storage capacity $V_1$ of the WFR+ rainwater storage capacity increased by conventional pre-lowering $V_2$ of the WFR=(ground surface elevation of the existing coastal plain area−normal water level of the WFR)× $S_2$+(normal water level of the WFR−conventional pre-lowered water level of the WFR)×$S_2$=(4−2.6)×$S_2$+(2.6−2.0)× $S_2$=1.4$S_1$×10% $S_1$+0.6×10% $S_1$=0.2$S_1$, which is equal to the rainfall of 0.2 m in the existing coastal plain area A, in the case without considering ground water seepage (e.g. 0.2 m×$S_1$=0.2$S_1$), and equivalent to the 24-hour rainfall of 0.215 m (215 mm) for a return period standard of 10 years.

Figure 1:
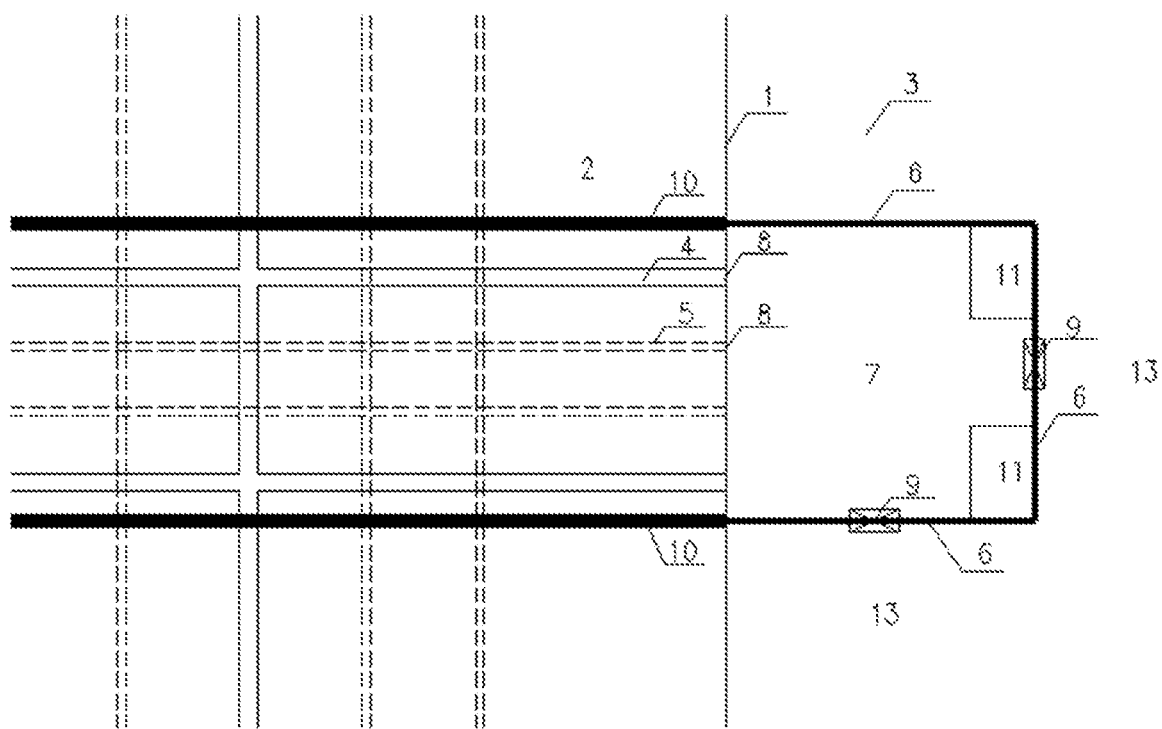
FIG. 1 is the layout of the first embodiment of the present invention.

Referring to FIG. 1, a method dedicated to mitigating flooding in the existing coastal plain area, which includes:

1. On the seabed outside partial existing coastline 3 in the existing coastal plain area A, three dykes 6 with an U-shaped layout that connect the existing coastline 1 are set/built to form an enclosed area. And four reservoir inlets 8 connecting river network(s) 4 and rainwater pipe network(s) 5 of the existing coastal plain area 2 to the enclosed area, and two reservoir outlets 9 connecting the enclosed area to the local sea 13, are both set on the dykes 6. The enclosed area, together with the dykes 6, the reservoir inlets 8 and the reservoir outlets 9, constitutes the RFR 7, whose area $S_3$ is 1/40 of the total area $S_1$ of the existing coastal plain area 2. For the sake of simplicity, it is assumed that the RFR's shore is upright in vertical, the planned or design highest water level in the RFR=the ground surface elevation of the existing coastal plain area=4.0 m, the crest elevation of the dykes 6 (e.g. 7.0 m) is higher than the planned or design highest water level (4.0 m) in the RFR 7 and higher than the planned or design highest tide level (5.0 m) of the local sea 13.

2. Within a week before the start of forecast heavy rainfall or forecast continuous rainfall, partial water in the RFR 7 is discharged to the local sea 13 in advance through the reservoir outlet(s) 9 (please refer to the item 5 of Embodiment 1 for details), and the water level in the RFR 7 is lowered in advance to the planned or design pre-lowered water level in the RFR before the start of forecast heavy rainfall or forecast continuous rainfall. The planned or design pre-lowered water level in the RFR is lower than the historical mean sea level of local sea, preferably lower than the historical mean low tide level of the local sea (e.g. 0 m), thus forming a huge drop (4 m) between the ground surface (with an elevation of 4.0 m) of the existing coastal plain area 2 and the planned or design pre-lowered water level (e.g. 0 m) in the RFR 7 as well as forming storage capacity $V_3$ for containing rainwater of the existing coastal plain area 2; the storage capacity $V_3$ of the RFR=(the planned or design highest water level in the RFR−the planned or design pre-lowered water level in the RFR)×$S_3$ (area of the RFR)= (4−0)×$S_3$=4$S_3$=4×(1/40 $S_1$)=0.1$S_1$.

In the process of pre-lowering the water level, the sluice(s) at the reservoir inlet(s) is (are) opened and controlled to make partial water in the WFR (river network 4 and lake, etc.) and rainwater pipe network(s) 5 in the existing coastal plain area 2 flow into the RFR 7 in advance through the reservoir inlet(s) 8, so that the water level of the WFR in the existing coastal plain area is also significantly expanded pre-lowered (for example, the water level is pre-lowered to 1 m), and rainwater storage capacity of the WFR in the existing coastal plain area 2 is also significantly increased. The effective storage capacity for containing rainwater against flooding in the WFR=natural rainwater storage capacity $V_1$ of the WFR+rainwater storage capacity increased by expanded pre-lowering $V_2{'}$ of the WFR=(4−2.6)×$S_2$+(2.6−1)×$S_2$=3×10% $S_1$=0.3$S_1$. Hence, the water level is pre-lowered 1 m more and storage capacity is increased by 50%, compared with the present flooding control method 2 as mentioned under background technology, in which the water level of the WFR is pre-lowered to 2.0 m and storage capacity of the WFR=(4−2)×$S_2$=2×10% $S_1$=0.2$S_1$.

Therefore, the total effective storage capacity for containing rainwater against flooding for the existing coastal plain area A=natural rainwater storage capacity $V_1$ of the WFR+rainwater storage capacity increased by expanded pre-lowering $V_2{'}$ of the WFR+rainwater storage capacity $V_3$ of the RFR=0.3$S_1$+0.1$S_1$=0.4$S_1$. Compared with the present flooding control method 2 as mentioned under background technology, in which the water level of the WFR is pre-lowered to 2.0 m and the effective storage capacity for containing rainwater against flooding of the WFR=(4−2)×$S_2$=2×10% $S_1$=0.2$S_1$, the total effective storage capacity for containing rainwater against flooding for the existing coastal plain area A is increased by 100%, and in the case without considering the ground seepage, bearable short-term heavy rainfall or continuous rainfall is increased by 100% from 0.2 m to 0.4 m, which is equivalent to that the flooding prevention capacity is increased to a return period standard of 500 years (0.385 m for 24-hour rainfall) from the return period standard of less than 10 years (0.215 m for 24-hour rainfall).

The discharge capacity of the sluices at reservoir inlets should be competent to satisfy the requirement that water volume which needs to be pre-lowered in the WFR, namely "(normal water level 2.6 m−water level after expanded pre-lowering 1.0 m)×$S_2$=1.6$S_2$," can be discharged within the duration of pre-lowering. The discharge capacity can be determined pursuant to present calculation methods such as those provided in Design Specification for Sluices (Chinese Code).

The drainage capacity of drainage sluices and drainage pumping stations of the RESERVOIR should be competent to satisfy the requirements that both water volume which needs to be pre-lowered in the RESERVOIR, namely "(normal water level in RESERVOIR, e.g. 2.6 m−the planned or design pre-lowered water level in the RESERVOIR, e.g. 0 m)×$S_3$=2.6$S_3$", and water volume which needs to be pre-lowered in the WFR, namely "(normal water level 2.6 m−water level after expanded pre-lowering 1.0 m)×$S_2$=1.6$S_2$", can be discharged from the RESERVOIR within the duration (for example, a week) of pre-lowering. The drainage capacity can be determined pursuant to present calculation methods such as those provided in Design Specification for Sluices and Code for Design of outdoor Wastewater Engineering (Chinese Codes).

During the period of heavy rainfall or continuous rainfall, the rainfall in the existing coastal plain area 2 converges into the WFR from ground surface and then flows into the RFR 7 through the reservoir inlet(s) 8. Since the total effective storage capacity for containing rainwater against flooding for the existing coastal plain area is substantially increased, the flooding caused by rainfall in the locality in existing coastal plain area is substantially mitigated.

At this time, the gradient i' of river runoff and rainwater pipe network flow from the existing coastal plain area 2 to the RFR 7, is significantly larger than the gradient i of river runoff and rainwater pipe network flow from the existing coastal plain area 2 that directly discharges into the local sea 13. Taking the maximum gradient as an example: L is the flowing distance of river runoff and rainwater pipe network flow, the maximum gradient=(ground surface elevation of the existing coastal plain area−the planned or design pre-lowered water level in RFR)/L=(4−0)/L=4/L, the maximum gradient $i_{max}$=(ground surface elevation of the existing coastal plain area−historical mean low tide level in the local sea or the low tide level in local sea when encountering astronomical tide and storm surge elevation)=(4−1~3)/L=1/L~3/L. The corresponding drainage speed and drainage capacity (water discharge per unit time) are significantly increased. The discharge speed of ground surface water from rainfall in the existing coastal plain area 2 is accelerated significantly and water inundation (or accumulation) on the ground is substantially mitigated, in other words, the flooding caused by rainfall in the locality is substantially mitigated.

3. In the case that the elevation (e.g. 1 m to 2 m) of existing seabed within the RFR 7 is higher than the planned or design pre-lowered water level in the RFR (e.g. 0 m), the existing seabed is excavated to the planned or design pre-lowered water level in RFR (e.g. 0 m). The structure of the dykes 6 should be competent to withstand actions of water level and waves in the RESERVOIR 7, the tidal level and waves of the local sea 13, and actions caused by differences between water levels inside and outside the RESERVOIR 7 as well as actions of seepage due to the differences between water levels inside and outside the RESERVOIR.

4. The reservoir inlet(s) 8 can make use of existing sluice(s) of the river network(s) and rainwater pipe network(s) in existing coastal plain area, or the reservoir inlet(s) 8 is (are) equipped with new inlet sluice(s); The reservoir inlet sluice(s) is (are) used to prevent the water level of river network(s) in the existing coastal plain area from being pre-lowered too low or prevent the reservoir water from flowing back into the WFR in the existing coastal plain area. If no secondary disasters affecting the safety of revetment or riverfront buildings will be caused by the water level of the WFR in the existing coastal plain area being pre-lowered too low, or if there will be no backflow of reservoir water to the WFR, the reservoir inlet(s) can also be without sluice(s), the river network(s) and rainwater pipe network(s) of the existing coastal plain area can be directly connected the RFR. Present technologies are adopted for sluice(s), which are not shown in attached figures.

5. The reservoir outlet(s) 9 is (are) equipped both with a drainage sluice (or drainage sluices) and a drainage pumping station (or drainage pumping stations). Sluice drainage mode is used, that is, to open the sluice(s) during the period of low tide (the period when the tide level is lower than 2.0 m in the case without water level increase due to surge) to discharge water (in the RFR 7) above the low tide level to the local sea 13, or pumping drainage mode is used, that is, to discharge water within the RFR 7 hydraulically into the local sea 13 through the drainage pumping station(s) to further lower the water level in the RFR, or combined mode of sluice drainage and pumping drainage is used to lower the water level in the RFR more quickly. The reservoir outlet(s) 9 can also be only set with drainage sluice(s) which is (are) opened only during the period of low tide to discharge the water (in the RFR 7) above the low tide level to the local sea 13. Present technologies are adopted for drainage sluice(s) and drainage pumping station(s), which are not shown in attached figures.

6. Furthermore, an expressway or highway can be set/built on the top of three dykes 6 with a U-shaped layout, to connect roads or highways 10 in the existing coastal plain area to improve local traffic network. Present technologies are adopted for the expressway or highway, which are not shown in attached figures.

7. Furthermore, floating solar photovoltaic systems 11 (with a rectangle-shaped layout or a layout in any other shape) can be established on parts of water surface within the RFR 7, to generate electricity by utilizing solar energy during non-rainfall period, so as to provide power for the RFR 7 that uses pumping drainage to lower water level. Present technologies are adopted for floating solar photovoltaic systems 11, which are not shown in attached figures.

8. Furthermore, appropriate landscape, leisure and amusement facilities can be set up in the RFR 7, including landscape belt around the lake, green belt around the lake, wetlands within the lake, water sports center, water playground, yacht port area and the ship locks for access of yachts to the RESERVOIR, which can be open to the public during non-rainwater catchment period and closed during rainwater catchment period. Present technologies are adopted for the landscape, leisure and amusement facilities, which are not shown in attached figures.

The aforesaid dyke(s), the excavation of seabed, the reservoir inlet sluice(s), the drainage sluice(s), the drainage pumping station(s), the floating solar photovoltaic systems, the expressway or highway on top of the dyke(s), and the landscape, leisure, amusement facilities can be carried out using present technologies, which do not need to be introduced in details hereby and details are not shown in attached figures.

Embodiment 2

Existing coastal plain area B, provided with following conditions: 1) the total area is S and the ground surface elevation is 4.0 m; 2) the WFR area is $S_2$, for simplicity, it is assumed that the WFR's shore is upright in vertical, a water area ratio is 5% (which equals to the ratio of $S_2$ to $S_1$), and a normal water level of 2.6 m in the WFR; 3) historical mean high tide level of the local sea is 3.0 m, mean tide level is 2.0 m, mean low tide level is 1 m, and within one tide (for a duration of 12.5 hours), the duration during which tide level is lower than the mean tide level is about 6 hours; 4) the planned or design highest tide level of the local sea is 4.0 m; 5) the original flooding control method adopted is the present flooding control method 2, that is, lowering the water level of the WFR to 2.0 m in advance within one week before the start of forecast heavy rainfall or continuous rainfall, and storage capacity for containing rainwater against flooding of the WFR=natural rainwater storage capacity $V_1$ of the WFR+rainwater storage capacity increased by conventional pre-lowering $V_2$ of the WFR= (ground surface elevation of the existing coastal plain area− normal water level of the WFR)×$S_2$+(normal water level of WFR−pre-lowered water level of the WFR)×$S_2$=(4−2.6)× $S_2$+(2.6−2.0)×$S_2$=1.4$S_1$×5% $S_1$+0.6×5% $S_1$=0.1$S_1$, which is equal to the rainfall of 0.1 m in the area, in the case without considering ground water seepage (namely 0.1 m×$S_1$=0.1$S_1$); 6) 24-hour rainfall for a return period standard of 1 year, 100 years and 200 years is 0.115 m (115 mm), 0.315 m (315 mm) and 0.345 m (345 mm) respectively.

Figure 2:
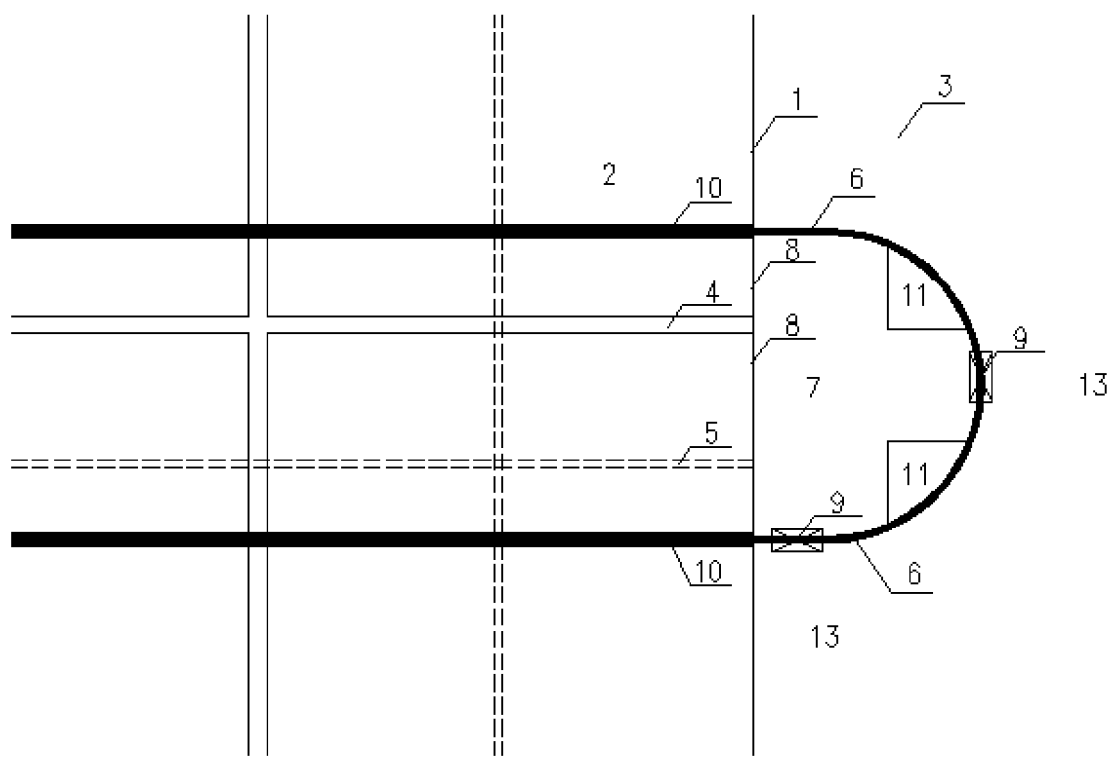
FIG. 2 is the layout of the second embodiment of the present invention.

Referring to FIG. 2, a method dedicated to mitigating flooding in the existing coastal plain area, which includes:

1. On the seabed 3 outside partial existing coastline 3, a dyke 6 with a C-shaped layout that connects the existing coastline 1, is set/built to form an enclosed area; And two reservoir inlets 8 connecting river network(s) 4 and rainwater pipe network(s) 5 of the existing coastal plain area 2 to the enclosed area, and two reservoir outlets 9 connecting the enclosed area to the local sea 13 are both set on the dyke 6. The enclosed area, together with the dyke 6, the reservoir inlets 8 and the reservoir outlets 9, constitutes the RFR 7, whose area $S_3$ is 1/20 of the total area $S_1$ of the existing coastal plain area 2. For simplicity, it is assumed that the RFR 7's shore is upright in vertical, the planned or design highest water level in the RFR 7=the ground surface elevation of the existing coastal plain area 2=4.0 m, the crest elevation of the dyke 6 (e.g. 5.0 m) is higher than the planned or design highest water level (4.0 m) in the RFR 7 and higher than the planned or design highest tide level (4.0 m) of the local sea 13.

2. Within a week before the start of forecast heavy rainfall or forecast continuous rainfall, the drainage sluice(s) and/or drainage pumping station(s) of reservoir outlet(s) 9 is (are) opened and controlled to discharge partial water within the RFR 7 in advance to the local sea 13, and the water level in the RFR 7 is lowered in advance to the planned or design pre-lowered water level in the RFR 7 before the start of forecast heavy rainfall or forecast continuous rainfall. The planned or design pre-lowered water level in the RFR is lower than the historical mean sea level of the local sea, preferably lower than historical mean low tide level of the local sea (e.g. 0 m), thus forming a huge drop (4 m) between the ground surface (with an elevation of 4.0 m) of the existing coastal plain area 2 and the planned or design pre-lowered water level (e.g. 0 m) in the RFR 7 as well as forming storage capacity $V_3$ for containing rainwater of the existing coastal plain area 2. The storage capacity $V_3$ of the RFR=(the planned or design highest water level in the RFR−the planned or design pre-lowered water level in the RFR)×$S_3$ (area of the RFR)=(4−0)×$S_3$=4$S_3$=4×(1/20$S_1$)= 0.2$S_1$.

In the process of pre-lowering water level, the sluice(s) at the reservoir inlet(s) is opened and controlled to make partial water within the WFR (river network 4 and lake, etc.) and rainwater pipe network(s) 5 in the existing coastal plain area 2 flow into the RFR 7 in advance through the reservoir inlet(s) 8, so that the water level of the WFR in the existing coastal plain area is also significantly lowered in advance (for example, the water level is pre-lowered to 1 m) and rainwater storage capacity of the WFR in the existing coastal plain area 2 is also significantly increased. The effective storage capacity for containing rainwater against flooding in the WFR=natural rainwater storage capacity $V_1$ of the WFR+rainwater storage capacity increased by expanded pre-lowering $V_2'$ of the WFR=(4−2.6)×$S_2$+(2.6−1)×$S_2$=3× 5% $S_1$=0.15$S_1$. Hence, the water level is pre-lowered 1 m more and storage capacity of the WFR is increased by 50%, compared with the present flooding control method 2 as mentioned under background technology, in which the water level is pre-lowered to 2.0 m and effective storage capacity for containing rainwater against flooding of the WFR=(4− 2)×$S_2$=2×5% $S_1$=0.1$S_1$.

Therefore, the total effective storage capacity for containing rainwater against flooding for the existing coastal plain area=natural rainwater storage capacity $V_1$ of the WFR+ rainwater storage capacity increased by expanded pre-lowering $V_2'$ of the WFR+rainwater storage capacity $V_3$ of the RFR=0.15$S_1$+0.2$S_1$=0.35$S_1$. Compared with the present flooding control method 2 as mentioned under background technology, in which the water level of the WFR is pre-lowered to 2.0 m and the effective storage capacity for containing rainwater against flooding of the WFR=(4−2)×$S_2$=2×5% $S_1$=0.1 $S_1$, the total effective storage capacity for containing rainwater against flooding for the existing coastal plain area is increased by 250%, and in the case without considering the ground seepage, bearable short-term heavy rainfall or continuous rainfall is increased by 250% from 0.1 m to 0.35 m, which is equivalent to that the flooding prevention capacity is increased to a return period standard of 200 years (0.345 m for 24-hour rainfall) from the return period standard of less than 1 year (0.115 m for 24-hour rainfall).

The discharge capacity of the sluices at reservoir inlets should be competent to satisfy the requirement that water volume which needs to be pre-lowered in the WFR, namely "(normal water level 2.6 m–water level after expanded pre-lowering 1.0 m)×$S_2$=1.6$S_2$", can be discharged to the RESERVOIR within the duration of pre-lowering (for example, a week). The discharge capacity can be determined pursuant to present calculation methods such as those provided in Design Specification for Sluices (Chinese code).

The drainage capacity of drainage sluices and drainage pumping stations of the RESERVOIR should be competent to satisfy the requirements that both water volume which needs to be pre-lowered in the RESERVOIR, namely "(normal water level in RESERVOIR, e.g. 2.6 m, –the planned or design pre-lowered water level in the RESERVOIR, e.g. 0 m)×$S_3$=2.6$S_3$" and water volume which needs to be pre-lowered in the WFR, namely "(normal water level 2.6 m–water level after expanded pre-lowering 1.0 m)×$S_2$=1.6$S_2$", can be discharged from the RESERVOIR within the duration (for example, a week) of pre-lowering. The drainage capacity can be determined pursuant to present calculation methods such as those provided in Design Specification for Sluices and Code for Design of outdoor Wastewater Engineering (Chinese code).

During the period of heavy rainfall or continuous rainfall, the rainfall in the existing coastal plain area 2 converges into the WFR from ground surface and then flows into the RFR 7 through the reservoir inlet(s) 8. Since the total effective storage capacity for containing rainwater against flooding for the existing coastal plain area is substantially increased, the flooding caused by rainfall in the locality in existing coastal plain area is substantially mitigated.

At this time, the gradient of river runoff and rainwater pipe network flow from the existing coastal plain area 2 to the RFR 7 is significantly larger than that of river runoff and rainwater pipe network flow from the existing coastal plain area 2 which directly discharges into the local sea 13. Taking the maximum gradient as an example, L is the flowing distance of river runoff and rainwater pipe network flow, the maximum gradient i of the former=(ground surface elevation of the existing coastal plain area–the planned or design pre-lowered water level in RFR)/L=(4−0)/L=4/L, the maximum gradient i of the latter=(ground surface elevation of the existing coastal plain area–historical mean low tide level in the local sea)=(4−1)/L=3/L. The drainage speed and drainage capacity (water discharge per unit time) of the former are significantly increased compared with the latter. The discharge speed of ground surface water from rainfall in the existing coastal plain area 2 is accelerated significantly and water inundation (or accumulation) on the ground is substantially mitigated, in other words, the flooding caused by rainfall in the locality is substantially mitigated.

3. Same as that of item 3 of Embodiment 1.
4. Same as that of item 4 of Embodiment 1.
5. Same as that of item 5 of Embodiment 1.
6. Same as that of item 6 of Embodiment 1.
7. Same as that of item 7 of Embodiment 1.
8. Same as that of item 8 of Embodiment 1.

Embodiment 3

The existing coastal plain area A as mentioned under background technology is still taken as the example, with corresponding conditions same with those of Embodiment 1.

Figure 3:
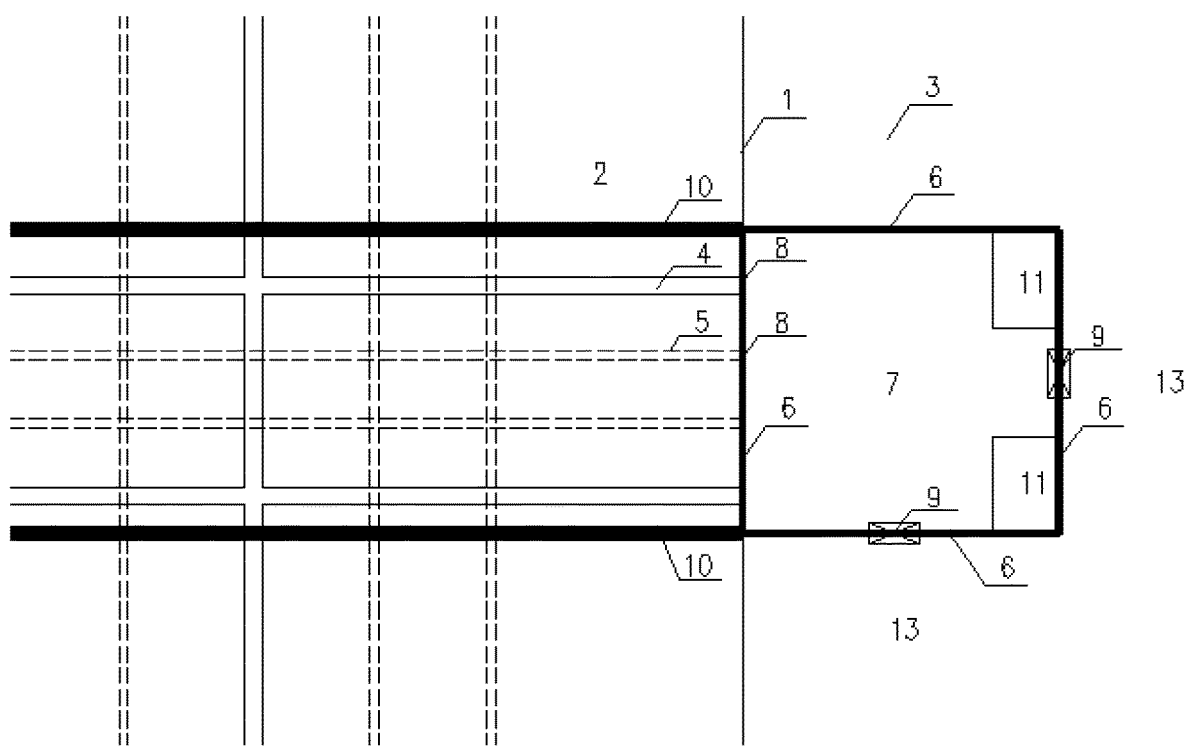
FIG. 3 is the layout of the third embodiment of the present invention.

Referring to FIG. 3, a method dedicated to mitigating flooding in existing coastal plain area, which includes:

1. On the seabed outside partial existing coastline 3 in the existing coastal plain area, four dykes 6 with a □-shaped layout are set/built to form an enclosed area; And four reservoir inlets 8 connecting river network(s) 4 and rainwater pipe network(s) 5 of the existing coastal plain area 2 to the enclosed area, and two reservoir outlets 9 connecting the enclosed area to the local sea 13, are both set on the dykes 6. The enclosed area, together with the dykes 6, the reservoir inlets 8 and the reservoir outlets 9, constitutes the RFR 7, whose area $S_3$ is ¹⁄₄₀ of the total area $S_1$ of the existing coastal plain area. The crest elevation of dykes 6 (e.g. 7.0 m) is higher than the planned or design highest water level (e.g. 4.0 m) in the RFR 7 and higher than the planned or design highest tide level (5.0 m) of the local sea 13.
2. Same as that of item 2 of Embodiment 1
3. Same as that of item 3 of Embodiment 1
4. Same as that of item 4 of Embodiment 1
5. Same as that of item 5 of Embodiment 1.
6. Furthermore, an expressway or highway can also be set/built on the top of the four dykes 6 with a □-shaped layout, to connect the roads or highways 10 in the existing coastal plain area to improve local traffic network. Present technologies are adopted for the expressway or highway, which are not shown in attached figure.
7. Same as that of item 7 of Embodiment 1
8. Same as that of item 8 of Embodiment 1.

Embodiment 4

The existing coastal plain area A as mentioned under background technology is still taken as the example, with corresponding conditions same with those of Embodiment 1.

Figure 4:
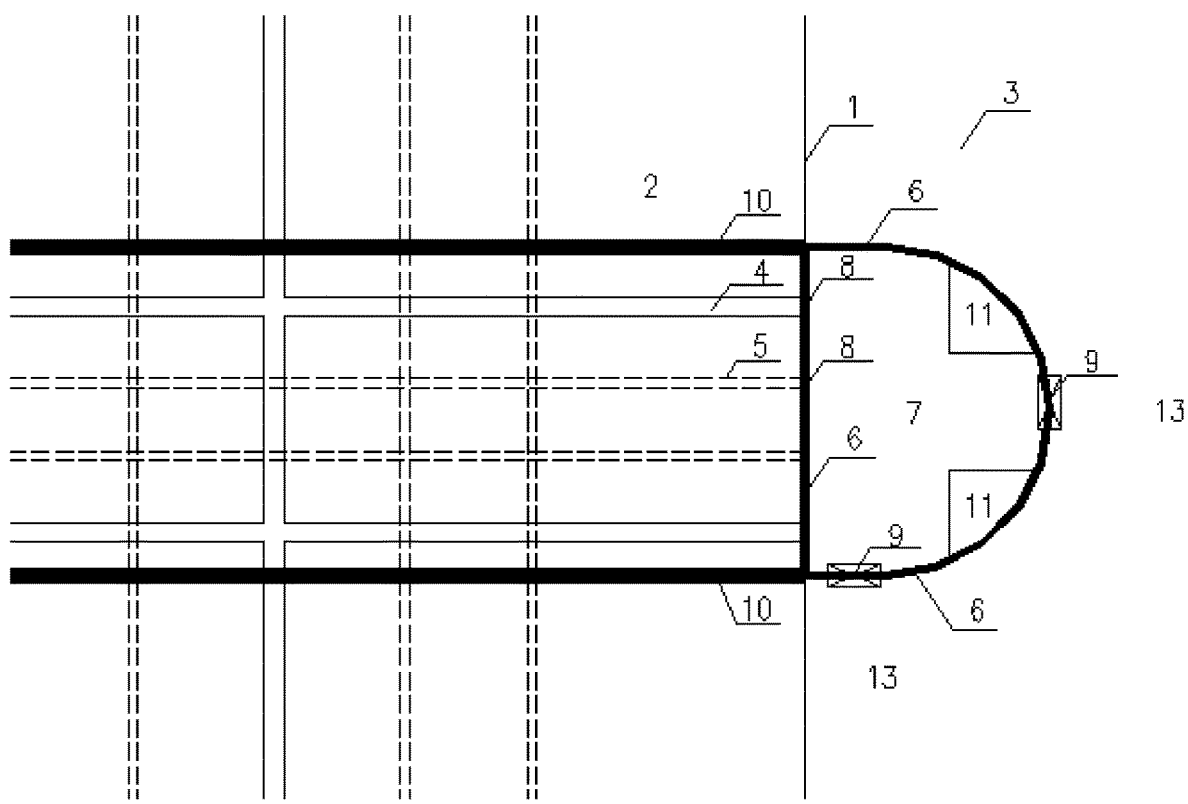
FIG. 4 is the layout of the fourth embodiment of the present invention.

Referring to FIG. 4, a method dedicated to mitigating flooding in existing coastal plain area, which includes:

1. On the seabed outside partial existing coastline 3 in the existing coastal plain area, a dyke 6 with a D-shaped layout is set/built to form an enclosed area; And four reservoir inlets 8 connecting river network(s) 4 and rainwater pipe network(s) 5 of the existing coastal plain area 2 to the enclosed area, and two reservoir outlets 9 connecting the enclosed area to the local sea 13, are both set on the dyke 6. The enclosed area, together with the dyke 6, the reservoir inlets 8 and the reservoir outlets 9, constitutes the RFR 7, whose area $S_3$ is ¹⁄₄₀ of the total area $S_1$ of the existing coastal plain area. The crest elevation of the dyke 6 (e.g. 7.0 m) is higher than the planned or design highest water level (e.g. 4.0 m) in the RFR 7 and higher than the planned or design highest tide level (5.0 m) of the local sea 13.
2. Same as that of item 2 of Embodiment 1.
3. Same as that of item 3 of Embodiment 1.
4. Same as that of item 4 of Embodiment 1.
5. Same as that of item 5 of Embodiment 1.
6. Furthermore, an expressway or highway can also be set/built on the top of the dyke 6 with a D-shaped layout, to connect roads or highways 10 in the existing coastal plain area to improve local traffic network.

Present technologies are adopted for the expressway or highway, which are not shown in attached figure.
7. Same as that of item 7 of Embodiment 1.
8. Same as that of item 8 of Embodiment 1.

Embodiment 5

The existing coastal plain area A as mentioned under background technology is still taken as the example, with corresponding conditions same with those of Embodiment 1.

Figure 5:
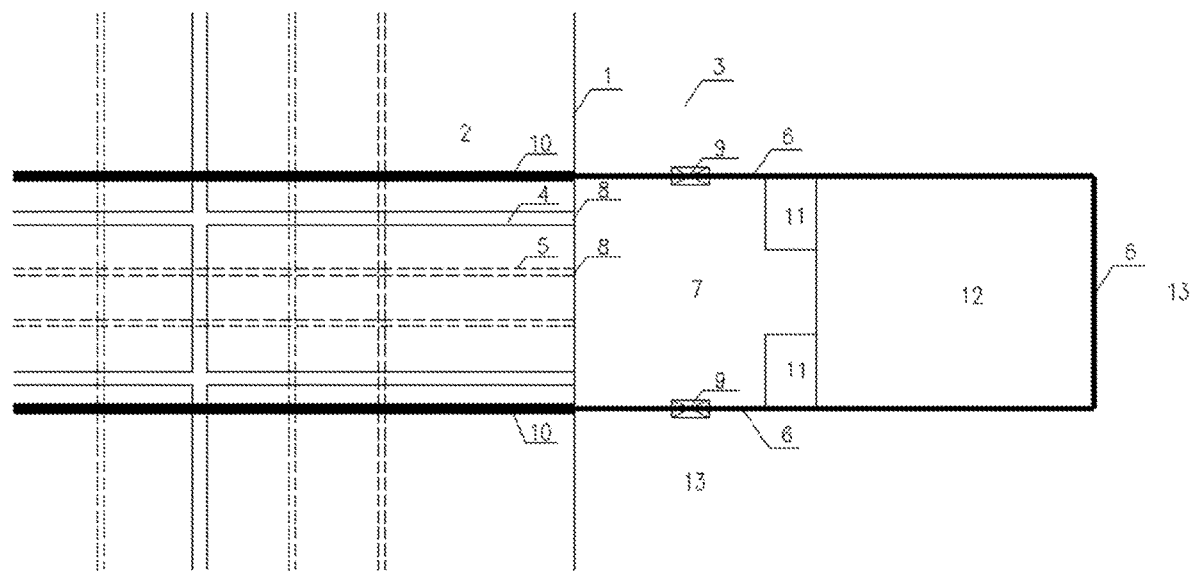
FIG. 5 is the layout of the fifth embodiment of the present invention.

Referring to FIG. 5, a method dedicated to mitigating flooding in the existing coastal plain area, which includes:
1. On the seabed outside partial existing coastline 3 in the existing coastal plain area, three dykes 6 with an U-shaped layout that connect the existing coastline 1 are set/built to form an enclosed area; And four reservoir inlets 8 connecting river network(s) 4 and rainwater pipe network(s) 5 of the existing coastal plain area to the enclosed area, and two reservoir outlets 9 connecting the enclosed area to the local sea 13, are both set on the dykes 6. A portion of the enclosed area, together with its bordering dykes 6, the reservoir inlets 8 and the reservoir outlets 9, constitutes the RFR 7. The remaining areas within the enclosed area are of the reclamation areas 12 to be backfilled or reclaimed to form lands. The crest elevation of the dykes 6 (e.g. 7.0 m) is higher than the planned or design highest water level in the RFR 7 (e.g. 4.0 m) and higher than the planned or design highest tide level of the local sea (e.g. 5.0 m).
2. Same as that of item 2 of Embodiment 1.
3. The RFR 7 is set on the side adjacent to or close to the existing coastline 1, so as to shorten the distance between the river network(s) 4 & rainwater pipe network(s) 5 of the existing coastal plain area 2 and the RFR 7. If the elevation of existing seabed (e.g. 1 m to 2 m) within the RFR 7 is higher than the planned or design pre-lowered water level (e.g. 0 m) in the RFR, the existing seabed is excavated to the planned or design pre-lowered water level (e.g. 0 m) in the RFR. The structure of the dykes 6 of the RFR 7 should be competent to withstand actions of water level and waves in the RESERVOIR 7, the tidal level and waves of the local sea 13, and actions caused by elevation differences between water levels inside and outside the RESERVOIR 7, as well as actions of seepage due to the elevation differences between water levels inside and outside the RESERVOIR.
4. Same as that of item 4 of Embodiment 1.
5. Same as that of item 5 of Embodiment 1.
6. Same as that of item 6 of Embodiment 1.
7. Same as that of item 7 of Embodiment 1.
8. Same as that of item 8 of Embodiment 1.
9. The reclamation areas 12 are set on the side adjacent to or close to the local sea, and the ground surface elevation (e.g. 5.5 m) of the reclamation areas 12 is not lower than the planned or design highest water level (e.g. 4.0 m) in the RFR 7. If the crest elevation of the seaside revetment (e.g. 7.0 m) is higher than the planned or design highest tide level (e.g. 5.0 m) of the local sea 13 and the structure is competent to withstand actions of tidal level and waves of the local sea 13, the portion of the three dykes 6 with an U-shaped layout located within the reclamation areas 12 can directly make use of the seaside revetment of the reclamation areas 12. Present technologies are adopted for seaside revetments, which are not shown in attached figure.
10. The RFR 7 is mainly to contain rainwater from the existing coastal plain area 2 and mitigate flooding in the existing coastal plain area 2. For this purpose, the ground surface elevation (e.g. 5.5 m) of the reclamation areas 12 had better be not lower than historical highest tide level of the local sea and the planned or design highest tide level of the local sea (5.0 m), so that the rainfall in the reclamation areas 12 can be directly discharged into the local sea 13 through their own river network(s) and rainwater pipe network(s) without occupying rainwater storage capacity of the RFR 7.

Embodiment 6

The existing coastal plain area A as mentioned under background technology is still taken as the example, with corresponding conditions same with those of Embodiment 1.

Figure 6:
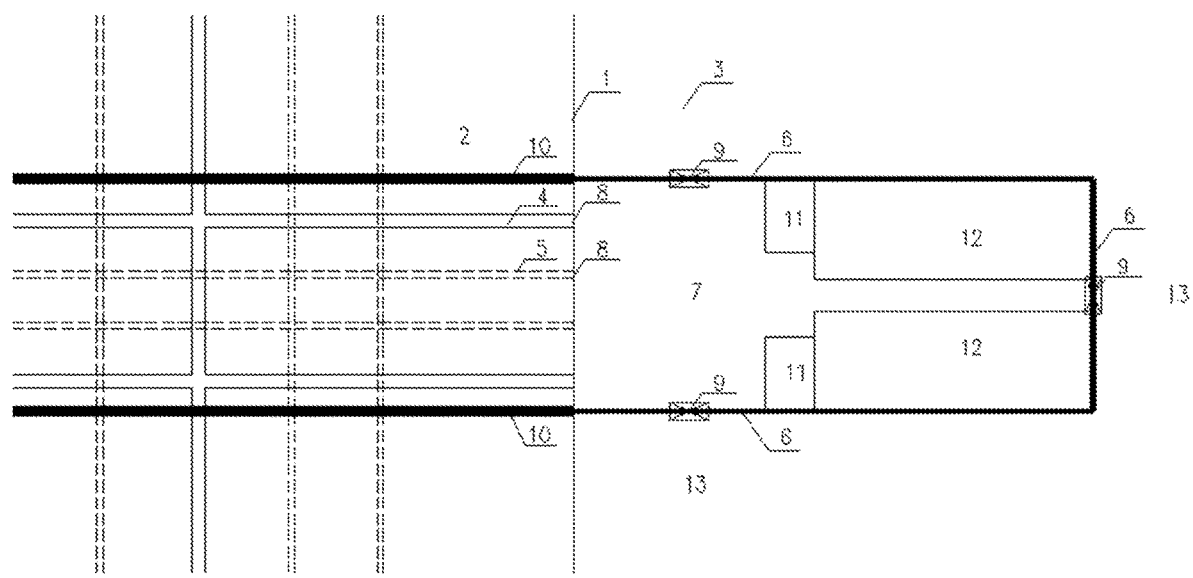
FIG. 6 is the layout of the sixth embodiment of the present invention.

Referring to FIG. 6, a method dedicated to mitigating flooding in the existing coastal plain area, which includes:
1. On the seabed outside partial existing coastline 3 in the existing coastal plain areas, three dykes 6 with an U-shaped layout connecting the existing coastline 1 are set/built to form an enclosed area; And four reservoir inlets 8 connecting river network(s) 4 and rainwater pipe network(s) 5 of the existing coastal plain area to the enclosed area, and two reservoir outlets 9 connecting the enclosed area to the local sea 13, are both set on the dykes 6. A portion of the enclosed area, together with its bordering dykes 6, the reservoir inlets 8 and the reservoir outlets 9, constitutes the RFR 7, presenting a shape of a large rectangle+a small rectangle (which could also be any other shape). The remaining areas within the enclosed area are of the reclamation areas 12 to be backfilled or reclaimed to form lands. The crest elevation of the dykes 6 (e.g. 7.0 m) is higher than the planned or design highest water level in the RFR 7 (e.g. 4.0 m) and the planned or design highest tide level of the local sea (e.g. 5.0 m).
2. Same as that of item 2 of Embodiment 5.
3. The main part (the large rectangle as shown in the figure) of the RFR 7 is set on the side adjacent to or close to the existing coastline 1, and a small portion of the RFR 7 is set on the side adjacent to or close to the local sea. If the elevation of existing seabed (e.g. 1 m to 2 m) within the RFR 7 is higher than the planned or design pre-lowered water level (e.g. 0 m) in the RFR 7, the existing seabed is excavated to the planned or design pre-lowered water level in the RFR 7 (e.g. 0 m). The structure of dykes 6 of the RFR 7 should be competent to withstand actions of water level and waves in the RESERVOIR 7, the tidal level and waves of the local sea 13, and actions caused by elevation differences between water levels inside and outside the RESERVOIR 7, as well as actions of seepage due to the elevation differences between water levels inside and outside the RESERVOIR.
4. Same as that of item 4 of Embodiment 5.
5. Same as that of item 5 of Embodiment 5.
6. Same as that of item 6 of Embodiment 5.
7. Same as that of item 7 of Embodiment 5.
8. Same as that of item 8 of Embodiment 5.
9. Same as that of item 9 of Embodiment 5.
10. Same as that of item 10 of Embodiment 5.

The foregoing description of embodiments is intended to facilitate understanding and application of the present invention for technicians having ordinary skill in the relevant art. It is obviously easy for the personnel familiar with the art to make various modifications to these embodiments and apply general teachings as expressed herein to other embodiments without any creative efforts. Therefore, the present invention is not confined to exact embodiments and examples as mentioned herein, and any improvements and modifications made to the present invention pursuant to disclosures hereof are within extent of protection for the present invention.

What is claimed:

1. A method of mitigating flooding in existing coastal plain areas, the method comprising the following steps:
   (1) positioning at least one dyke on a seabed outside an existing coastline of an existing coastal plain area to form an enclosed area, or positioning at least one dyke on a seabed outside an existing coastline of an existing coastal plain area and connecting to the existing coastline to form a partially enclosed area;
      on the existing coastline adjacent the enclosed area, positioning at least one reservoir inlet connecting at least one river network or at least one rainwater pipe network in the existing coastal plain area to the enclosed area, and on the at least one dyke, positioning at least one reservoir outlet connecting the enclosed area to a local sea;
      wherein the enclosed area, together with the at least one dyke, the at least one reservoir inlet and the at least one reservoir outlet, comprises a "Reservoir on coastal beach For containing Rainwater against flooding caused by rainfall in a locality" (RFR), and a crest elevation of the at least one dyke is higher than a design highest water level in the RFR and a design highest tide level of the local sea;
   (2) within a discharging step, which is a period before the start of a forecast heavy rainfall or a forecast continuous rainfall, discharging water in the RFR into the local sea through the at least one reservoir outlet, resulting in lowering a water level in the RFR to a design pre-lowered water level in advance of the forecast heavy rainfall or the forecast continuous rainfall, wherein the design pre-lowered water level in the RFR is lower than a historical mean sea level of the local sea;
      during the discharging step, opening and controlling at least one sluice at the at least one reservoir inlet, thereby causing water in a "Water area For containing Rainwater against flooding caused by rainfall in the locality in the existing coastal plain area" (WFR) and water in the at least one river network or the at least one rainwater pipe network in the existing coastal plain area to flow into the RFR through the at least one reservoir inlet, such that a water level of the WFR is also lowered in advance of the forecast heavy rainfall or the forecast continuous rainfall;
   (3) excavating existing seabed in the RFR to the design pre-lowered water level in the RFR when the elevation of the existing seabed within the RFR is higher than the design pre-lowered water level in the RFR; wherein the at least one dyke is configured to withstand actions of water level and waves in the RFR, actions of tidal level and waves of the local sea, and actions from water level difference inside and outside the RFR, as well as actions of seepage caused by water level difference inside and outside the RFR;
   (4) preventing the water level in the WFR from lowering below an allowable minimum water level and preventing the water in the RFR from flowing back into the WFR with the at least one reservoir inlet sluice, wherein the at least one reservoir inlet sluice is the existing sluice of the at least one river network or at least one rainwater pipe network in the existing coastal plain area, or a new inlet sluice installed on the at least one reservoir inlet; and
   (5) equipping the at least one reservoir outlet with at least one drainage sluice and at least one drainage pumping station, and applying different drainage modes to the at least one reservoir outlet, or equipping the at least one reservoir outlet with the at least one drainage sluice only.

2. The method of claim 1, wherein, for Step (1), the at least one dyke includes at least one dyke with a layout comprising linear sides that connect to the existing coastline, or at least one dyke with a layout comprising a shape.

3. The method of claim 2, wherein the at least one dyke with a layout comprising linear sides comprises three dykes with a U-shaped layout or a dyke with a C-shaped layout, and the at least one dyke with a layout comprising a shape comprises four dykes with a rectangular-shaped layout or a dyke with a D-shaped layout.

4. The method of claim 1, wherein, for Step (2), the period is one week.

5. The method of claim 1, wherein, for Step (2), the design pre-lowered water level in the RFR is lower than the historical mean low tide level of the local sea.

6. The method of claim 1, Step (2) further comprises, during the discharging step and during the period of low tide, opening at least one additional drainage sluice positioned on the existing coastline outside the RFR to discharge water in the WFR into the local sea.

7. The method of claim 1, wherein, for Step (5), applying different drainage modes includes:
   (a) applying a sluice drainage mode to open the at least one drainage sluice during the period of low tide to discharge water in the RFR above the low tide level into the local sea; or
   (b) applying a pumping drainage mode to discharge water in the RFR hydraulically into the local sea through the at least one drainage pumping station to further lower the water level therein; or
   (c) applying a combined mode of sluice drainage and pumping drainage to lower the water level in the RFR.

8. The method of claim 1, wherein, for Step (5), the at least one drainage sluice is opened only during the period of low tide to discharge the water in the RFR above the low tide level into the local sea.

9. The method of claim 1, further comprising positioning an expressway or highway on a top of the at least one dyke to connect the dyke with at least one road network or highway network in the existing coastal plain area.

10. The method of claim 1, further comprising positioning floating solar photovoltaic systems on parts of a water area in the RFR to generate electricity for the RFR by utilizing solar energy during non-rainfall period.

11. The method of claim 1, further comprising installing landscape, leisure and amusement facilities in the RFR, and opening the landscape, leisure and amusement facilities to the public during non-rainwater catchment periods, and closing the landscape, leisure and amusement facilities to the public during rainwater catchment periods.

12. The method of claim 11, wherein the landscape, leisure and amusement facilities include a landscape belt around a lake, or a green belt around the lake, or wetlands within the lake, or a water sports center, or a water playground, or a yacht port and ship locks for access of yachts to the RFR.

13. A method of mitigating flooding in existing coastal plain areas, the method comprising the following steps:

(1) positioning at least one dyke on a seabed outside an existing coastline of an existing coastal plain area to form an enclosed area, or positioning at least one dyke on a seabed outside an existing coastline of an existing coastal plain area and connecting to the existing coastline to form a partially enclosed area;

on the existing coastline adjacent the enclosed area, positioning at least one reservoir inlet connecting at least one river network or at least one rainwater pipe network in the existing coastal plain area to the enclosed area, and on the at least one dyke, positioning at least one reservoir outlet connecting the enclosed area to a local sea;

wherein a portion of the enclosed area, together with a portion of the at least one dyke that borders the portion of the enclosed area, the at least one reservoir inlet and the at least one reservoir outlet, comprises a "Reservoir on coastal beach For containing Rainwater against flooding caused by rainfall in the locality" (RFR), the remaining portion within the enclosed area is a reclamation area, the reclamation area is backfilled to form land, and a crest elevation of the at least one dyke is higher than a design highest water level in the RFR and a design highest tide level of the local sea;

(2) within a discharging step, which is a period before the start of a forecast heavy rainfall or a forecast continuous rainfall, discharging water in the RFR into the local sea through the at least one reservoir outlet to lower a water level in the RFR to a design pre-lowered water level in advance of the forecast heavy rainfall or the forecast continuous rainfall, wherein the design pre-lowered water level in the RFR is lower than a historical mean sea level of the local sea;

during the discharging step, opening and controlling at least one sluice at the at least one reservoir inlet, thereby causing water in a "Water area For containing Rainwater against flooding caused by rainfall in the locality in the existing coastal plain area" (WFR) and water in the at least one river network or the at least one rainwater pipe network in the existing coastal plain area to flow into the RFR through the at least one reservoir inlet, such that a water level of the WFR is also lowered in advance of the forecast heavy rainfall or the forecast continuous rainfall;

(3) excavating existing seabed in the RFR to the design pre-lowered water level in the RFR when the elevation of the existing seabed within the RFR is higher than the design pre-lowered water level in the RFR, wherein the at least one dyke is configured to withstand actions of water level and waves in the RFR, actions of tidal level and waves of the local sea, and actions from water level difference inside and outside the RFR, as well as actions of seepage caused by water level difference inside and outside the RFR;

(4) preventing the water level in the WFR from lowering below an allowable minimum water level and preventing the water in the RFR from flowing back into the WFR with the at least one reservoir inlet sluice, wherein the at least one reservoir inlet sluice is the existing sluice of the at least one river network or at least one rainwater pipe network in the existing coastal plain area, or a new inlet sluice installed on the at least one reservoir inlet; and (5) equipping the at least one reservoir outlet with at least one drainage sluice and at least one drainage pumping station, and applying different drainage modes to the at least one reservoir outlet, or equipping the at least one reservoir outlet with the at least one drainage sluice only.

14. The method of claim 13, wherein the positioning step comprises positioning at least one dyke within the enclosed area such that the at least a portion of the RFR is adjacent to the existing coastline, thereby shortening the distance from the at least one river network and the at least one rainwater pipe network in the existing coastal plain area to the RFR.

15. The method of claim 13, wherein, for Step (1), the at least one dyke includes at least one dyke with a layout comprising linear sides that connect to the existing coastline, or at least one dyke with a layout comprising a shape.

16. The method of claim 13, wherein, for Step (2), the period is one week.

17. The method of claim 13, wherein, for Step (2), the design pre-lowered water level in the RFR is lower than the historical mean low tide level of the local sea.

18. The method of claim 13, wherein, for Step (5), applying different drainage modes includes:
(a) applying a sluice drainage mode to open the at least one drainage sluice during the period of low tide to discharge water in the RFR above the low tide level into the local sea; or
(b) applying a pumping drainage mode to discharge water in the RFR hydraulically into the local sea through the at least one drainage pumping station to further lower the water level therein; or
(c) applying a combined mode of sluice drainage and pumping drainage to lower the water level in the RFR.

19. The method of claim 13, wherein, for Step (5), the at least one drainage sluice is opened only during the period of low tide to discharge the water in the RFR above the low tide level into the local sea.

20. The method of claim 13, further comprising positioning an expressway or highway on the top of the at least one dyke to connect with at least one road network or highway network in the existing coastal plain area.

21. The method of claim 13, further comprising positioning floating solar photovoltaic systems on parts of water area in the RFR to generate electricity for the RFR by utilizing solar energy during non-rainfall period.

22. The method of claim 13, further comprising installing landscape, leisure and amusement facilities in the RFR, and opening the landscape, leisure and amusement facilities to the public during non-rainwater catchment periods, and closing the landscape, leisure and amusement facilities to the public during rainwater catchment periods.

23. The method of claim 13, wherein the positioning step comprises positioning at least one dyke such that the reclamation area is adjacent to the local sea, and wherein backfilled land comprises a ground surface elevation not lower than the design highest water level in the RFR.

24. The method of claim 13, wherein the ground surface elevation of the reclamation area is not lower than the historical highest tide level and the design highest tide level of the local sea, such that the rainfall in the reclamation area is configured to be directly discharged into the local sea through the at least one river network or the at least one rainwater pipe network within the reclamation area, without occupying storage capacity of the RFR.

* * * * *